(12) United States Patent
Mastrolia

(10) Patent No.: US 7,500,639 B2
(45) Date of Patent: Mar. 10, 2009

(54) AIRCRAFT EJECTION SEAT WITH ADJUSTABLE HEADREST

(75) Inventor: Brad Mastrolia, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 361 days.

(21) Appl. No.: 11/445,879

(22) Filed: Jun. 2, 2006

(65) Prior Publication Data

US 2007/0278347 A1  Dec. 6, 2007

(51) Int. Cl.
*B64D 25/02* (2006.01)

(52) U.S. Cl. ............. 244/122 R; 244/122 A; 297/410; 297/344.1

(58) Field of Classification Search ........... 244/122 R, 244/122 A, 122 AB, 122 AC, 122 AD, 122 AE; 297/344.1, 344.12, 344.17, 410, 468, 474, 297/475

See application file for complete search history.

(56) References Cited

U.S. PATENT DOCUMENTS

| | | | | |
|---|---|---|---|---|
| 2,619,157 A | * | 11/1952 | Guyton et al. | 297/284.9 |
| 2,702,677 A | * | 2/1955 | Replogle | 244/122 A |
| 3,437,294 A | * | 4/1969 | Martin | 244/122 R |
| 3,738,706 A | * | 6/1973 | Caldemeyer | 297/410 |
| 4,285,545 A | * | 8/1981 | Protze | 297/483 |
| 5,171,062 A | * | 12/1992 | Courtois | 297/340 |
| 5,642,302 A | | 6/1997 | Dumont et al. | |
| 5,918,940 A | * | 7/1999 | Wakamatsu et al. | 297/410 |
| 6,540,299 B1 | * | 4/2003 | Gosk et al. | 297/410 |
| 6,573,673 B1 | | 6/2003 | Hampel et al. | |

* cited by examiner

*Primary Examiner*—Michael Carone
*Assistant Examiner*—Benjamin P Lee
(74) *Attorney, Agent, or Firm*—Jerry J. Holden; John D. Titus

(57) ABSTRACT

An aircraft ejection seat includes a frame and a headrest. The vertical position of the seat is adjusted by a pair of motor driven lead screws that cooperate with threaded barrel nuts attached to the seat frame. The upper end of one of these motor driven lead screws drives a slip coupling driving a splined shaft. The splined shaft then drives a gearbox mounted to the seat frame. The gearbox in turn drives an upper lead screw, which acts on an upper barrel nut to move the headrest up and down relative to the seat frame. The upper lead screw is driven in the opposite direction from the lower lead screws. Consequently, as the seat moves up to accommodate a shorter pilot, the headrest moves down to accommodate the shorter torso of the shorter pilot.

6 Claims, 4 Drawing Sheets

AIRCRAFT EJECTION SEAT WITH ADJUSTABLE HEADREST

BACKGROUND OF THE INVENTION

This invention relates to aircraft components, in particular to aircraft ejection seats.

Aircraft ejection seats in modern piloted fighter aircraft must serve a variety of functions within a limited space. In addition to providing physical support for the pilot, the seat must house the ejection seat rocket, recovery parachute, survival kit and other equipment. The seat must be adjustable so as to maintain the pilot within the design eye of the aircraft instruments irrespective of the pilot's stature. The ejector seat headrest must also perform many functions including canopy breaker, harness attachment, head impact attenuator, and headrest panel. Prior art fighter aircraft ejection seats had headrests that were either not adjustable at all or if adjustable did not adjust to correspond to the seat elevation. Accordingly, headrest adjustment was at best cumbersome.

SUMMARY OF THE INVENTION

The present invention solves the foregoing problem by providing a headrest that moves proportionately opposite to the motion of the aircraft seat. This coordinated adjustment ensures that the design eye of the seat is fixed while at the same time ensuring that the headrest is sufficiently above the pilot's helmet so in the event of an ejection the canopy breakers, rather than the pilot's helmet, strikes the canopy first.

According to an illustrative embodiment of the invention, the ejection seat comprises a seat frame having a back portion and seat portion. The vertical position of the seat is adjusted by a pair of motor driven lead screws that cooperate with threaded barrel nuts attached to the seat frame. The upper end of one of these motor driven lead screws drives a slip coupling consisting of an internally splined collar that mates with an externally splined shaft. The splined shaft then drives a gearbox mounted to the seat frame. The gearbox in turn drives an upper lead screw, which acts on an upper barrel nut to move the headrest up and down relative to the seat frame. The upper lead screw is driven in the opposite direction from the lower lead screws. Consequently, as the seat moves up to accommodate a shorter pilot, the headrest moves down to accommodate the shorter torso of the shorter pilot.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
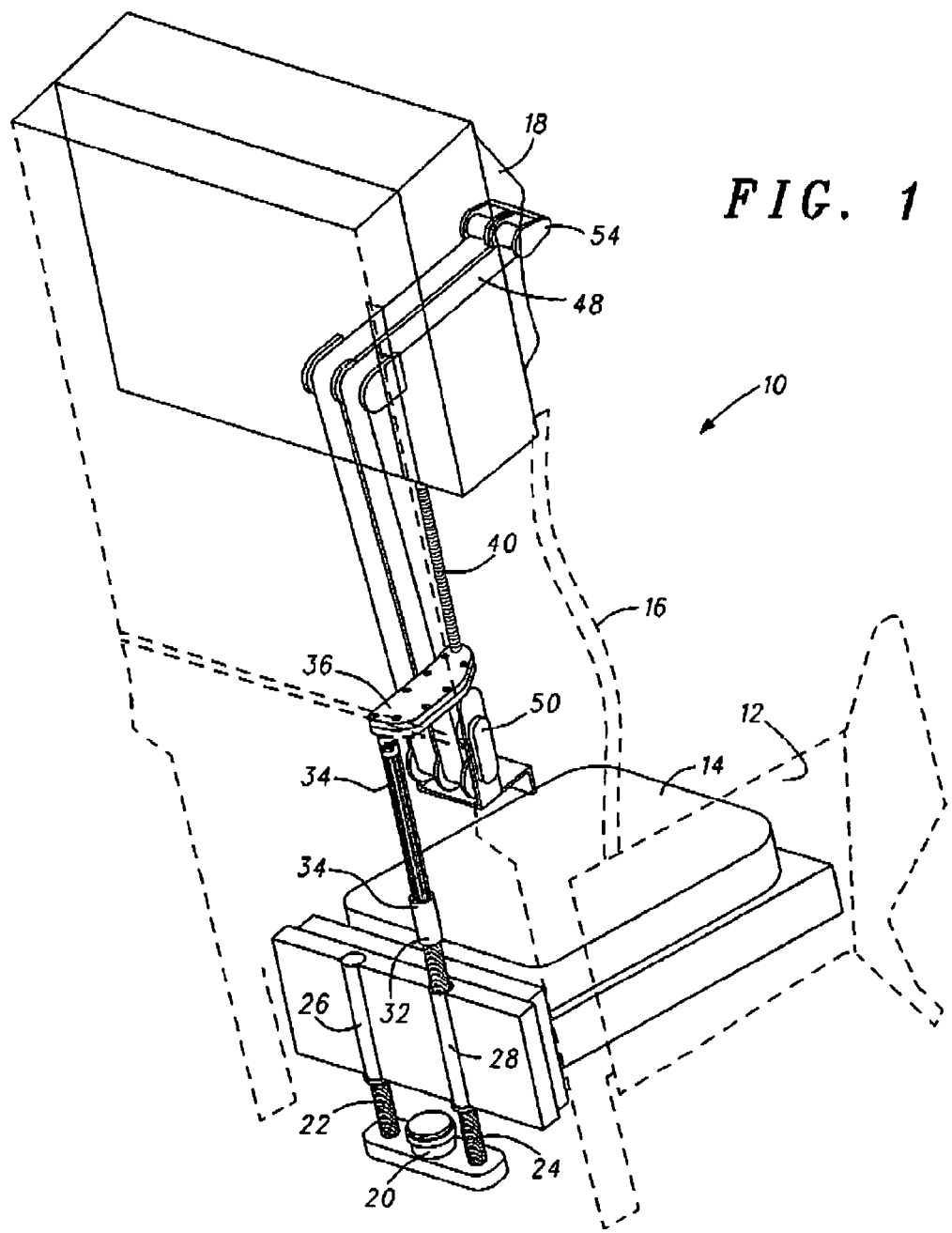
FIG. 1 is a rear perspective view partially in outline of an ejection seat incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

"With reference to FIG. 1, ejection seat 10 comprises a frame 12 supporting a seat portion 14, a back portion 16 and a headrest 18. In order to accommodate crewmembers of different statures, frame 12 and with it seat portion 14, back portion 16 and headrest 18 can be elevated as a unit by means of a main seat elevation motor 20 which drives a pair of first lead screws 22, 24. Barrel nuts 26, 28 attached to frame 12 convert the rotary motion of lead screws 22 and 24 into linear motion of frame 12 along the vertical axis of lead screws 22 and 24. Alternatively, it would be possible to use a solitary first lead screw to elevate frame 17 without departing from the scope of the present invention."

Figure 2:
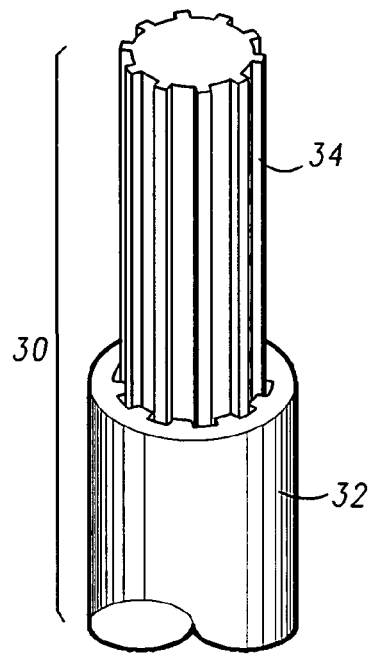
FIG. 2 is an enlarged perspective view of the slip coupling used in the embodiment of FIG. 1.
Figure 3:
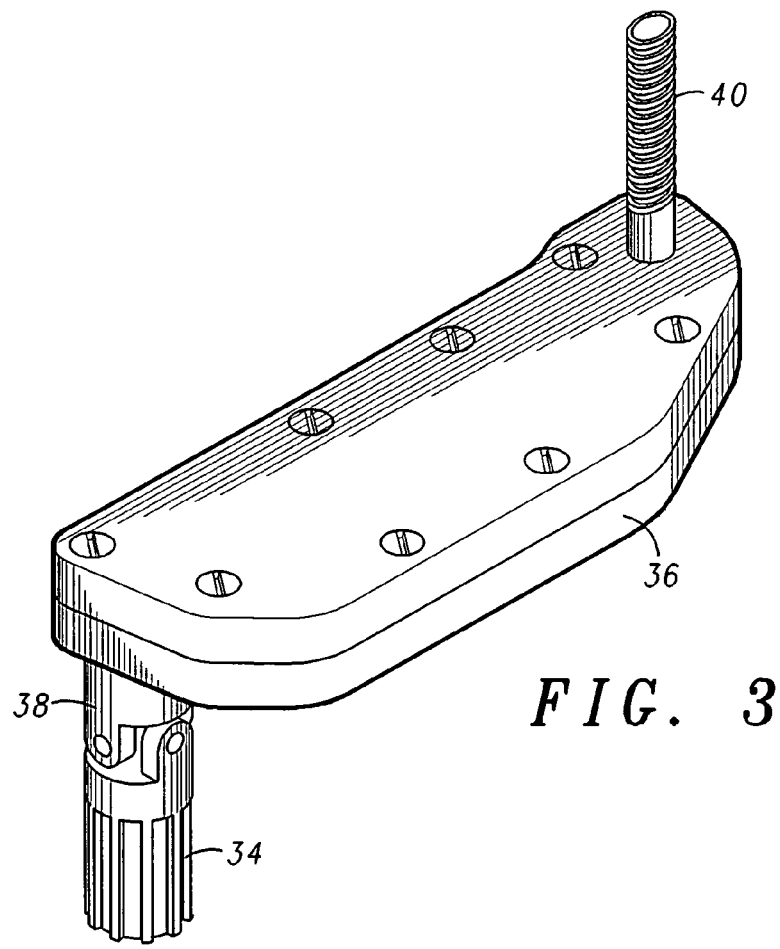
FIG. 3 is an enlarged perspective view of the gear housing used in the illustrative embodiment of FIG. 1.

With additional reference to FIGS. 2 and 3, the upper end of lead screw 24 terminates in a slip coupling 30 consisting of an internally splined sleeve 32 attached to lead screw 24 and an externally splined shaft 34, which is capable of sliding freely in and out of sleeve 32 while transmitting torque from lead screw 24 to a headrest actuator gear box 36.

Torque from shaft 34 enters gearbox 36 via a flexible coupling 38 which allows for some misalignment between gearbox 36 and shaft 34. Gearbox 36 contains a number of gears that provide a moderate gear reduction between shaft 34 and a second lead screw 40. In the illustrative embodiment, the pitch of lead screw 40 is the same as the pitch of lead screws 22 and 24. Accordingly, gearbox 36 provides a gear reduction between 0.9 to 1 and 0.5 to 1 preferably about 0.7 to 1. Gearbox 36 also reverses the direction of rotation between shaft 34 and lead screw 40 for reasons that will be explained more fully hereinafter.

Figure 4:
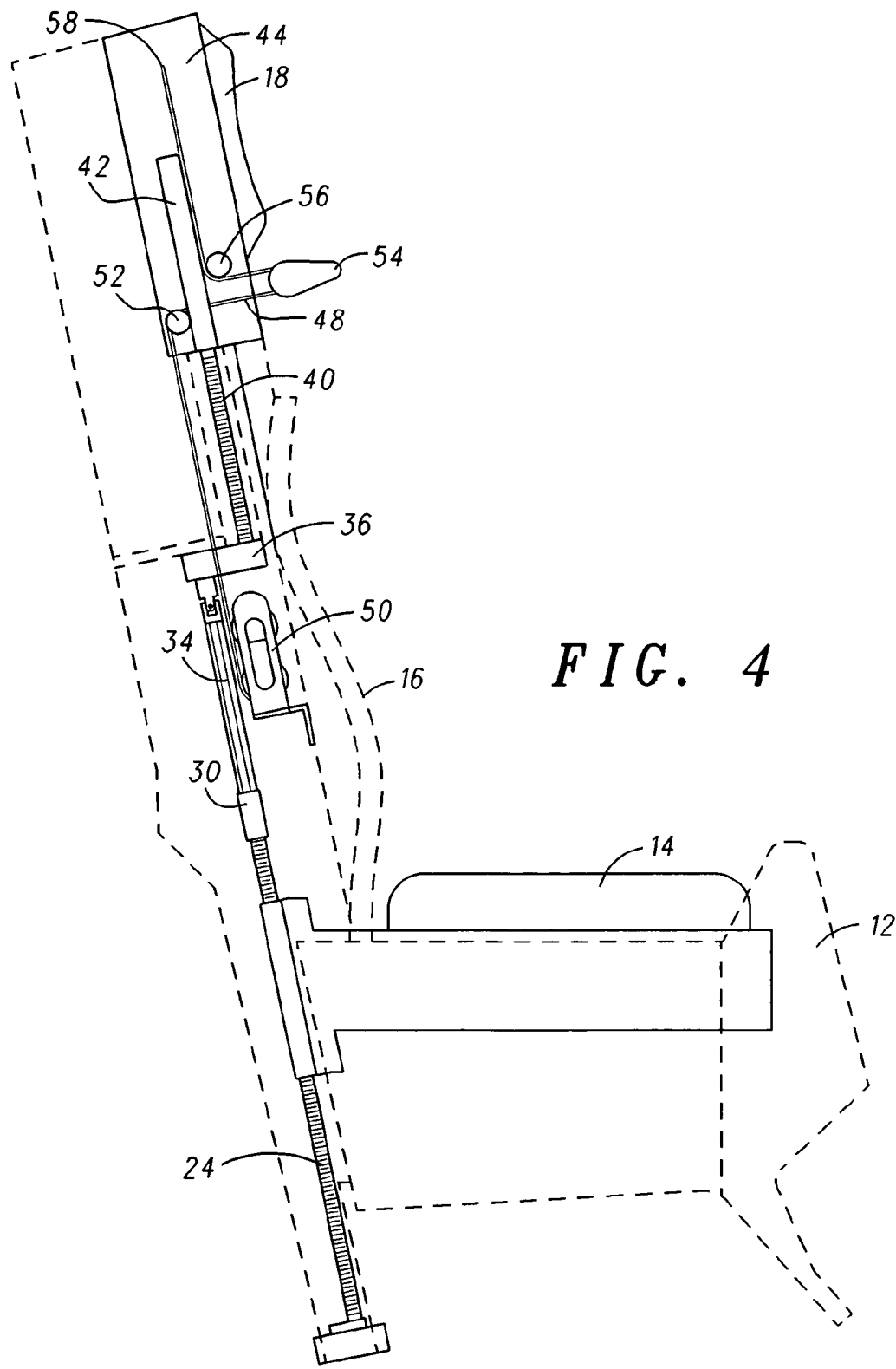
FIG. 4 is a side view of the ejection seat of FIG. 1 in its position for the tallest crewmember.
Figure 5:
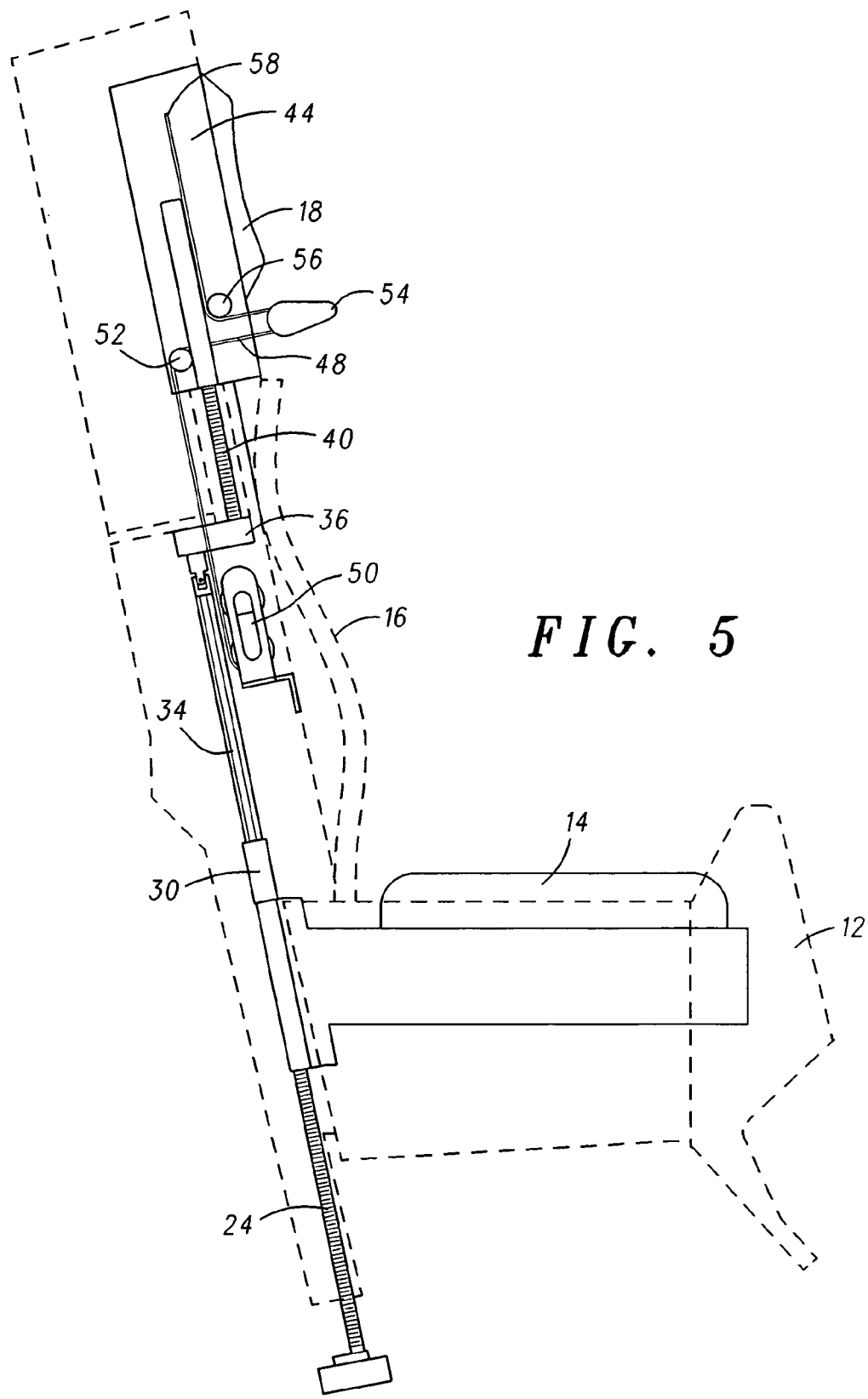
FIG. 5 is a side view of the ejection seat of FIG. 1 in its position for the shortest crewmember.

With further reference to FIGS. 4 and 5, barrel nut 42 converts rotary motion of lead screw 40 into linear motion of headrest bracket 44 and with it headrest 18. As noted hereinbefore, the motion of lead screw 40 is opposite that of lead screws 22 and 24 and is also between 50% and 90% of the speed of the lead screws 22 and 24. Accordingly, headrest 18 moves downward relative to frame 12 as frame 12 moves up and vice versa. Therefore, the location of the crewmember's eyes remain within the design eye of the aircraft irrespective of crewmember's size.

Ejection seat 10 further comprises a crewmember harness strap 48. Crewmember harness strap 48 attaches to the crewmember's flight harness at the shoulder level to restrain the crewmember during maneuvering and to pull the crewmember tightly into the seat back during an ejection. Crewmember harness strap 48 is paid in and out of a power operated reel 50. Because of the limited space available inside frame 12, power operated reel 50 cannot be mounted to the headrest bracket 44. Accordingly, to accommodate the movement of headrest bracket 44, crewmember harness strap 48 is fed from power operated reel over a lower guide comprising a rolling capstan 52, through a conventional harness pulley 54 across an upper guide, which in the illustrative embodiment comprises a stationary capstan 56, but which could comprise a simple slot in headrest bracket 44, and terminating at a rigid connection 58 to headrest bracket 44 in a manner well known in the art.

As can be seen from the foregoing, in operation, as frame 12 is moved from its lowest position as shown in FIG. 4 to its highest position as shown in FIG. 5, as frame 12 moves up under the urging of lead screws 22 and 24, headrest 18 is lowered relative to frame 12 by the urging of lead screw 40. Simultaneously, power operated reel 50 feeds in a portion of crewmember harness strap 48 necessary to keep harness pulley 54 in the same position relative to headrest 18. Similarly, as frame 12 is moved from its highest position as shown in FIG. 5 to its lowest position as shown in FIG. 4, headrest 18 moves upward relative to frame 12 under the urging of lead screw 40. Simultaneously, power operated reel 50 pays out an amount of crewmember harness strap necessary to prevent harness pulley 54 from being drawn tight against headrest bracket 44.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment lead screw 40 has the same pitch as lead screws 22 and 24 but turns at 50% to 90% of the speed of lead screws 22 and 24 any combination of pitches and gear reductions that cause the headrest to move in an opposite direction from the seat frame at from 50% to 90% of the linear rate of the seat frame are considered within the scope of the invention. Accordingly, it is intended that the invention shall be limited only to the extent required by the appended claims and the rules and principals of applicable law.

What is claimed is:

1. An adjustable seat for mounting to an airframe of an aircraft, said adjustable seat comprising:
   a seat frame, said seat frame having a back portion, a seat portion and a headrest,
   a first lifting mechanism operatively attached to said seat frame for moving said seat frame from a first, lowered position to a second, elevated position, said first lifting mechanism comprising a first lead screw and a barrel nut, said first lead screw having a lower end driven by a motor attached to said airframe and an upper end extending upward from said lower end relative to said airframe when said airframe is in a normal horizontal orientation, said barrel nut being attached to said seat frame and engaging a threaded portion of said first lead screw for converting rotational motion of said first lead screw into linear motion of said barrel nut for lifting said seat frame relative to said airframe, said upper end of said first lead screw further including a splined extension:
   a second lifting mechanism operatively attached to said headrest for moving said headrest from a first elevated position to a second lowered position, said second lifting mechanism comprising a coupling and a second lead screw, said coupling supported by a bearing attached to said seat frame and slidingly engaging said splined extension for transmitting torque from said splined extension to said second lead screw, said second lifting mechanism further comprising a second barrel nut attached to said headrest and engaging a threaded portion of said second lead screw for converting rotational motion of said second lead screw into linear motion of said barrel nut for lifting said headrest relative to said seat frame, said second lead screw having an effective pitch opposite to said first lead screw, whereby as said seat frame is elevated relative to said airframe, said head rest is synchronously lowered relative to said seat frame.

2. The adjustable seat of claim 1, wherein:
   said head rest moves at a linear rate between 50 percent and 90 percent of the linear motion of said seat frame.

3. The adjustable seat of claim 1, further comprising:
   a gearbox interposed between said coupling and said second lead screw, said gearbox causing said second lead screw to counter rotate relative to said first lead screw.

4. The adjustable seat of claim 1, further comprising:
   a gearbox interposed between said coupling and said second lead screw, said gearbox causing said second lead screw to rotate more slowly than said first lead screw.

5. The adjustable seat of claim 3, wherein:
   said second lead screw rotates at a speed between 50 percent and 90 percent of said first lead screw.

6. The adjustable seat of claim 1, further comprising:
   a flight harness system, said flight harness system comprising
   a reel attached to said seat frame;
   a harness strap, said harness strap having a first portion having a first end stored on said reel and a second portion terminating in a second end having an attachment point attached to said seat frame proximal said headrest;
   a harness pulley having a roller portion and a fitting for attaching said harness pulley to an occupant, said harness strap passing over said roller portion of said harness pulley;
   a headrest mounting bracket attached to said headrest, said headrest mounting bracket having an upper guide and a lower guide for guiding said harness strap, said harness strap being routed so that it passes from said reel, then through said lower guide, through said roller portion of said harness pulley through said upper guide to said attachment point;
   whereby as said headrest is elevated and lowered, said upper guide and said lower guide move with said headrest to align said harness pulley with said headrest.

* * * * *